(12) United States Patent
Lovich

(10) Patent No.: US 11,805,419 B2
(45) Date of Patent: Oct. 31, 2023

(54) AUTOMATICALLY PAIRED DEVICES

(71) Applicant: Google LLC, Mountain View, CA (US)

(72) Inventor: Vitali Lovich, San Francisco, CA (US)

(73) Assignee: Google LLC, Mountain View, CA (US)

( * ) Notice: Subject to any disclaimer, the term of this patent is extended or adjusted under 35 U.S.C. 154(b) by 90 days.

(21) Appl. No.: 16/390,174

(22) Filed: Apr. 22, 2019

(65) Prior Publication Data
US 2020/0336896 A1    Oct. 22, 2020

(51) Int. Cl.
| | |
|---|---|
| *H04L 9/32* | (2006.01) |
| *H04W 12/50* | (2021.01) |
| *H04L 9/14* | (2006.01) |
| *H04L 9/30* | (2006.01) |
| *H04W 12/0431* | (2021.01) |
| *G06Q 20/12* | (2012.01) |

(52) U.S. Cl.
CPC .............. *H04W 12/50* (2021.01); *H04L 9/14* (2013.01); *H04L 9/30* (2013.01); *H04W 12/0431* (2021.01); *G06Q 20/12* (2013.01)

(58) Field of Classification Search
CPC ..................... H04W 12/003; H04W 12/04031; H04L 9/14; H04L 9/30
USPC ......................................................... 713/170
See application file for complete search history.

(56) References Cited

U.S. PATENT DOCUMENTS

| | | | | |
|---|---|---|---|---|
| 2004/0111480 | A1* | 6/2004 | Yue ..................... | H04L 63/0838 709/206 |
| 2010/0153709 | A1* | 6/2010 | Thomas ................ | H04L 9/0866 713/171 |
| 2012/0054493 | A1* | 3/2012 | Bradley ................ | H04W 8/005 713/168 |
| 2014/0065948 | A1* | 3/2014 | Huang ................... | H02J 50/70 361/679.01 |
| 2014/0223174 | A1* | 8/2014 | Krishnamurthy ..... | H04W 12/50 713/158 |
| 2014/0365694 | A1* | 12/2014 | Bolton .................. | G06F 13/385 710/106 |
| 2015/0082049 | A1* | 3/2015 | Rubinstein ............ | G06F 21/602 726/19 |
| 2015/0351145 | A1* | 12/2015 | Burks ................... | H04L 63/102 455/41.3 |
| 2015/0358169 | A1* | 12/2015 | Krishnamurthy ... | H04L 63/0823 713/175 |

OTHER PUBLICATIONS

International Search Report including Written Opinion for Application No. PCT/US2019/062529, dated Jan. 27, 2020, pp. 1-13.
International Preliminary Report on Patentability for International Application No. PCT/US2019/062529 dated Nov. 4, 2021. 8 pages.

* cited by examiner

*Primary Examiner* — Jeffrey C Pwu
*Assistant Examiner* — Samuel Ambaye
(74) *Attorney, Agent, or Firm* — Lerner David LLP

(57) ABSTRACT

A system and method for automatically connecting an accessory with a host device are disclosed. The accessory may include a private key and a public key, wherein the public key is associated with an account. The same account may be associated with the host device. The accessory may transmit an encrypted message, including a key, to the host device, wherein the key may be the public key. Upon decryption and validation of the key, the accessory and host device may automatically connect via short-range wireless pairing.

18 Claims, 6 Drawing Sheets

AUTOMATICALLY PAIRED DEVICES

BACKGROUND

Accessories compatible with a host device, such as a mobile phone, may be connected via a wire or short-range wireless pairing. For instance, certain types of wireless headphones may be connected to a mobile phone via Bluetooth. In some cases, the host device and accessory may be obtained from the same entity, e.g., a user may create an account with a mobile phone provider and obtain both the phone and the wireless headphones from the provider.

In order to establish a secure communication channel between the host device and the accessory that is cryptographically resistant to attack, the user may be required to pair the accessory with the device. Users may find the pairing process to be cumbersome. For example, in order to pair headphones with a mobile phone, the user may be required to navigate through a variety of screens to find and enable the Bluetooth pairing function in the phone's settings, find the correct button (or combination of buttons) to press on the accessory to enable its Bluetooth pairing function, select the headphones when they are displayed on the phone's screen, and potentially press additional buttons on the phone or headphones to confirm that the pairing should take place. If the accessory has a screen, the user may also be further prompted to confirm that an alphanumeric code displayed on the accessory matches the alphanumeric code displayed on the host device. In addition to having a potentially negative impact on the user's out of box experience ("OOBE"), a complex and time consuming pairing process increases the likelihood that the process will fail.

BRIEF SUMMARY

The present disclosure provides for the automatic connection of devices, such as between an accessory and a host device.

One aspect of the disclosure provides for an accessory having a short range wireless antenna, memory configured to store a public key and a private key, and one or more processors coupled to the memory and configured to transmit an encrypted message to a host device. The public key may be associated with the accessory and an account. The host device may also be associated with the account. The accessory and host device may automatically connect via short-range wireless pairing.

The public key may be associated with the serial number of the accessory and, in some instances, the key within the encrypted message transmitted by the accessory may be the public key.

The host device, upon receiving the encrypted message from the accessory, may validate the key. Further, the host device and accessory may automatically connect without receiving a user input, wherein the only user input that the accessory may receive is an input to associate the accessory with the account before automatically connecting the accessory and host device. When the accessory and host device automatically connect, confirmation may be received from the host device that the accessory is associated with the account.

Another aspect of the disclosure provides a method for an accessory to automatically connect to a host device. The method includes associating a public key and a private key with an accessory; associating the public key associated with the accessory with an account, wherein the account is also associated with a host device; transmitting, by the accessory, an encrypted message that includes a key, wherein the encrypted message is adapted to be decrypted by the host device; and automatically connecting, by the accessory, to the host device via a short-range wireless pairing when the encrypted message is decrypted.

In some instances, the public key and private key may be associated with the accessory during purchase by a user. Alternatively, the public key and private key may be associated with the accessory automatically when the accessory is purchased via a website associated with the account. In yet another example, the public key and private key may be associated with the accessory after purchase by a user. For example, the public key and private key may be associated with the accessory using radio-frequency identification. Alternatively, the public key and private key may be associated with the accessory using near-field communication. The public key may be associated with a serial number of the accessory.

In some instances, the account may be identified by a user's email address and associating the public key with the account comprising receiving the public key and the user's email address.

In some instances, automatically connecting may comprise receiving confirmation from the host device that the accessory is associated with the account. Further, according to some examples, the key included in the encrypted message may be the public key.

Another aspect of the disclosure provides a method for a host device to automatically connect to an accessory. The method includes associating a host device with an account, wherein the account is also associated with an accessory having a public key and a private key; associating, via a network, the public key of the accessory associated with the account with the host device; receiving, using one or more processors of the host device, an encrypted message transmitted by the accessory; validating, using the one or more processors of the host device, a key in the encrypted message; and connecting, via short-range wireless pairing, to the accessory.

In some instances, the host device may search, using the one or more processor of the host device, for the public key. In some examples, the accessory may be headphones. Thus, according to some examples, the host device may provide audio signals to the accessory after automatically connecting to the accessory.

DETAILED DESCRIPTION

Overview

The systems and methods described herein permit the automatic connecting of devices. For instance, an accessory may include a short-range wireless network antenna, one or more processors, and a memory storing a private key and a public key. The public key stored on the accessory and the host device to be connected with the accessory may be associated with the same account. For example, when the accessory was provided to the user, the public key may have been associated with the same account that the host device uses to connect to a cellular network or send and receive emails. When the accessory is within range of the host device, the accessory may transmit an encrypted message including a key to the host device and automatically connect with the host device via short-range wireless pairing.

The account may be associated with the public key of the accessory. The account that becomes associated with the public key of the accessory may be the same account associated with the host device, and the public key may be shared with the host device.

When the host device and accessory are within range of each other, the accessory may transmit an encrypted message. The host device may receive the encrypted message and validate its contents, which may include confirming that the accessory transmitting the encrypted message has the same public key associated with the account, and is, therefore, authorized to be connected to the host device. Upon validation, the host device and accessory may automatically connect, such that they become paired via short-range wireless pairing.

By providing for automatic connection, the user experience may be improved. For example, a new accessory may automatically connect with a host device without user input at the time of unboxing the accessory. Moreover, a secured communication channel may be established between the accessory and the host device, thereby making the accessory and host device less subject to attack.

Example Systems

Figure 1:
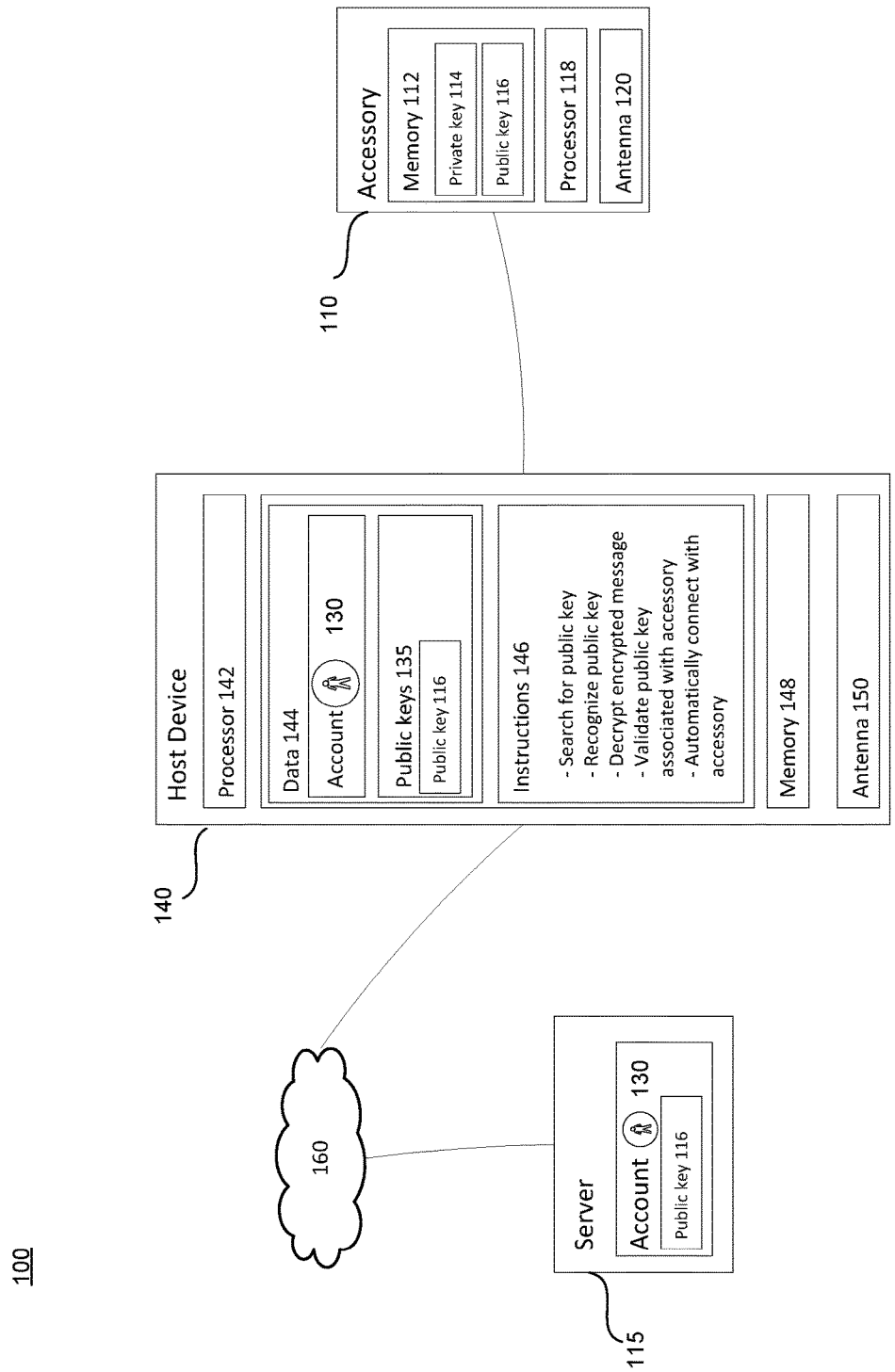
FIG. 1 is a functional diagram of an example system in accordance with aspects of the disclosure.

FIG. 1 illustrates an example system 100 in which the features described above may be implemented. It should not be considered as limiting the scope of the disclosure or usefulness of the features described herein. In this example, system 100 may include accessory 110, host device 140, and server 115 connected via network 160. Accessory 110 may contain one or more processors 118, an antenna 120, and memory 112. The antenna may be, for example, a short-range wireless network antenna. The accessory 110 may be able to communicate with server 115 and host device 140 via network 160.

Memory 112 of accessory 110 may store information that is accessible by processor 112. Memory 112 may also include data that can be retrieved, manipulated or stored by the processor 118. The memory 112 may be of any non-transitory type capable of storing information accessible by the processor 118, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories.

The data stored in memory 112 of accessory 110 may include private key 114 and public key 116. Public key 116 may be a unique identifier associated with accessory 110. The private key 116 may be stored only in the memory 112 of accessory 110 and may not be available elsewhere. The private key 116 and public key 114 may, in some examples, be created and stored on accessory 110 when the accessory is manufactured. The public key 116 may be associated with a serial number of the accessory 110, and the public key and its associated serial number may be provided to server 115. As such, server 115 may maintain a database (not shown) that pairs the serial number of the accessory to the public key 116 and private key 114.

Alternatively, the public key 114 and private key 116 may be associated with accessory 110 during the shipping process. For example, a box containing accessory 110 may be passed through a machine that utilizes radio-frequency identification (RFID) or near-field communication (NFC) to associate the public and private keys with the accessory 110. After associating the public and private keys via RFID or NFC and storing the public and private keys in its memory, the accessory 110 may be shipped.

In another alternative, the public key 114 and private key 116 may be associated with accessory 110 at the location where the accessory 110 is distributed, such as a retail store or the warehouse from which an online retail store ships the accessory. In this instance, the distributor may unwrap the sealed accessory 110, program the accessory 110 to have the public key 114 and private key 116, and then repackage the accessory 110. In yet another alternative, the public key 114 and private key 116 may be associated with accessory 110 by a vendor or provider, different than the vendor or provider of the account, who will cooperate with the vendor or provider of account 130 so that the public key may be shared with the account.

The one or more processors 118 may include any conventional processors, such as a commercially available CPU or microprocessor. Alternatively, the processor can be a dedicated component such as an ASIC or other hardware-based processor. Although not necessary, accessory 110 may include specialized hardware components to perform specific computing functions faster or more efficiently. The one or more processors 118 may be configured to transmit encrypted messages.

Although FIG. 1 functionally illustrates the processor, memory, and other elements of accessory 110 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the accessory 110. Accordingly, references to a processor or computing device will be understood to include references to a collection of processors or computing devices or memories that may or may not operate in parallel.

The accessory 110 can be at various nodes of a network 160 and capable of directly and indirectly communicating with other nodes of network 160. Although only a single accessory is depicted in FIG. 1, it should be appreciated that a typical system can include one or more accessories, with each accessory being at a different node of network 160. The network 160 and intervening nodes described herein can be interconnected using various protocols and systems, such that the network can be part of the Internet, World Wide Web, specific intranets, wide area networks, or local networks. The network 160 can utilize standard communications protocols, such as WiFi, that are proprietary to one or more companies. Although certain advantages are obtained when information is transmitted or received as noted above, other aspects of the subject matter described herein are not limited to any particular manner of transmission.

The host device 140 may be configured similarly to the accessory 110, with one or more processors 142 and memory 148, as described above. Memory 148 may store information that is accessible by the processors 142, including instructions 146 that may be executed by processors 142, and data 144.

Data 144 may be retrieved, stored or modified by processors 142 in accordance with instructions 146. For instance, although the present disclosure is not limited by a particular data structure, the data 144 may be stored in computer registers, in a relational database as a table having a plurality of different fields and records, XML documents, or flat files. The data 144 may also be formatted in a computer-readable format such as, but not limited to, binary values, ASCII or Unicode. By further way of example only, the data 144 may comprise information sufficient to identify the relevant information, such as numbers, descriptive text, proprietary codes, pointers, references to data stored in other memories (including other network locations) or information that is used by a function to calculate the relevant data. In accordance with one example, data 144 may include credentials associated with account 130 thereby associating host device 140 with account 130. Data 144 may also include public keys 135.

The instructions 146 can be any set of instructions to be executed directly, such as machine code, or indirectly, such as scripts, by the processor 142. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The host device 140 may further include an antenna 150. The antenna 150 may be, for example, a short-range wireless network antenna. The host device 140 may be able to communicate with account 130 and server 115 via network 160.

Host device may be a mobile computing device capable of wirelessly exchanging data over the network 160. By way of example only, host device 140 may be a mobile phone or a device such as a smart phone, a tablet PC, or a netbook that capable of obtaining information via the Internet. In another example, host device 140 may be a head-mounted computing system. Alternatively, host device 140 may be a personal computing device intended for use by a user 125, and have all of the component normally used in connection with a personal computing device such as a central processing unit (CPU), a display (e.g., a monitor having a screen, a touch-screen, a projector, a television, or other device that is operable to display information), and user 125 input device (e.g., a mouse, keyboard, touch-screen or microphone). Although only a single host device is depicted in FIG. 1, it should be appreciated that at typical system can include one or more host devices, with each host device being a different node of network 160.

Host device 140 may be associated with an account 130. For instance, data 144 stored on host device 140 may include a unique identifier that is used to access account information stored on server 115 via network 160. The account 130 may be used to obtain private and public keys of authorized or associated devices. For example, account 130 may be associated with a provider, such as a cellular phone service provider or an e-mail host provider, such as Google. Alternatively, the account 130 may be used to log into a play store or app store on host device 140.

Example Methods

Figure 2:
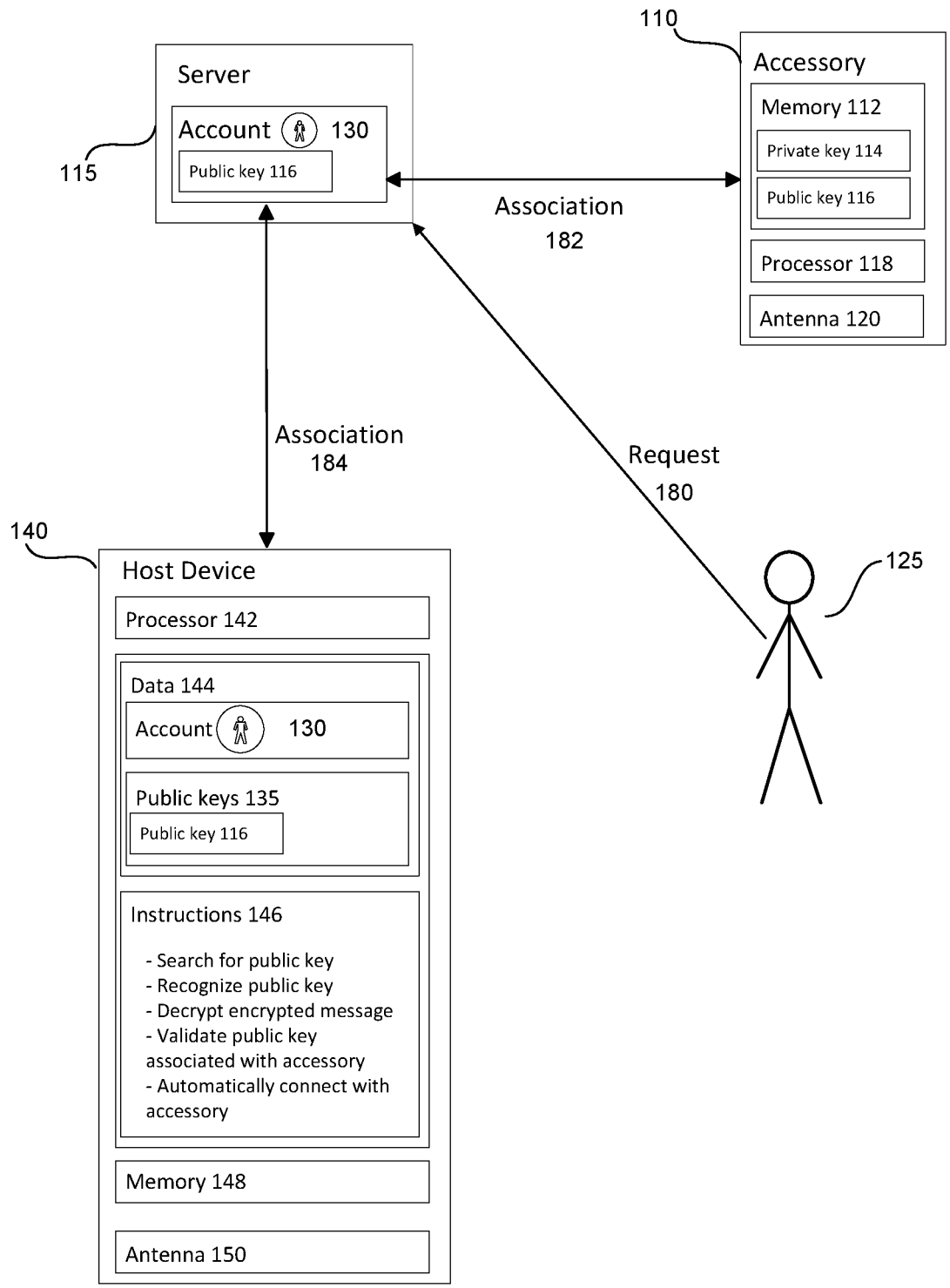
FIG. 2 is a functional diagram exemplifying the connections among a host device, an account, and a server in accordance with aspects of the disclosure.

FIG. 2 illustrates one example of the relationships that may exist among host device 140, server 115, accessory 110, and user 125 before the accessory and host device are connected. In this example, user 125 visits a website that is, for ease of illustration, hosted on the same server as account 130. User 125 may log into account 130, purchase accessory 110, and submit a request 180 that the accessory be shipped to the user's address.

The public key associated with the accessory may be associated with the account. For instance, server 115 may store a copy or reference to public key 116 with the other information in account 130, thereby creating an association 182 between account 130 and accessory 110. The association may occur at the time the user 125 purchases the accessory 110. Alternatively, the user 125 may purchase the accessory 110 without using an account. The user 125 may then associate the public key 116 with account 130 at a later date by submitting a request to a server 115. In yet another alternative, the user 125 may visit a brick and mortar store to purchase the accessory 110. The user may then associate the public key 116 with account 130 at the time of purchase or at a later date in accordance with methods described above.

The public key may be associated with the host device that is associated with the account. For example, host device 140 may include instructions for requesting public keys that have been associated with account 130 or responding to messages from server 115 that a public key for an accessory has been added to the account. In either case, host device 140 may receive the public key associated with account 130 and store it as one of the public keys 135 within data 144, thereby creating an association 184 between account 130 and host device 140.

Figure 3:
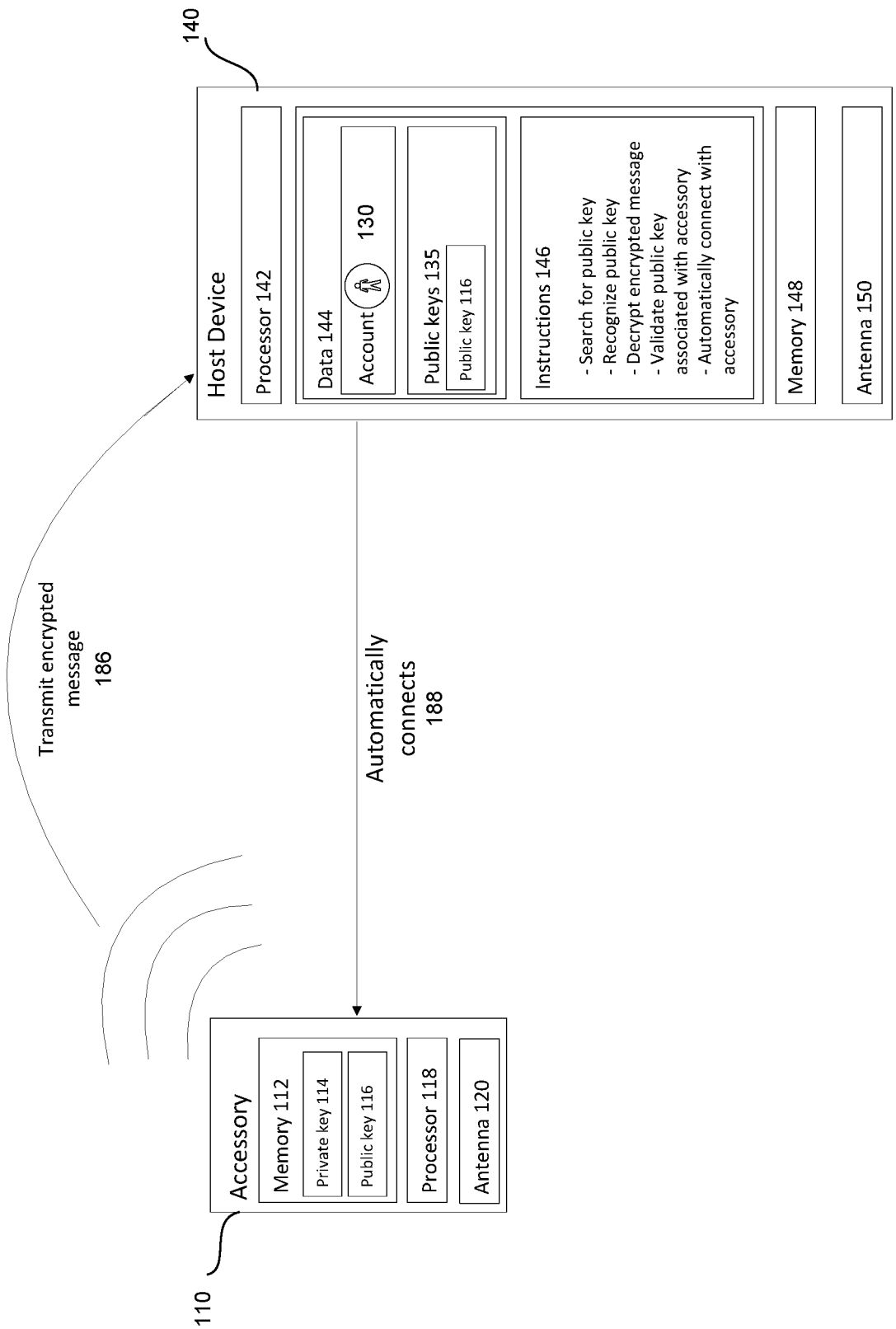
FIG. 3 is a functional diagram exemplifying the connection method between the host device and accessory in accordance with aspects of the disclosure.

FIG. 3 illustrates an example of the exchange of information between the host device and accessory when they are within range of each other. By way of example, host device 140 and accessory 110 each have an antenna 150, 120, respectively, wherein the antennas 150, 120 may be short range wireless network antennas. For instance, the antennas may be used to transmit and receive Bluetooth signals. Thus, there may be a maximum distance between host device 140 and accessory 110 that would allow host device 140 and accessory 110 to be within range of each other.

When the host device and accessory are within range of each other, the host device or accessory, or both, may detect the presence of the other. For example, host device 140 may determine whether a previously-unknown accessory is within range by periodically checking whether the antenna received a connection request and, if so, alerting accessory 110 to its presence. Host device 140 may also emit a connection request and accessory 110 may alert host device 140 of its presence.

The accessory may transmit an encrypted message to be received by host device. The encrypted message may be encrypted using the private key. According to one example, the encrypted message may be associated with a key. For instance, the host device may recognize the format of the message as an opportunity to automatically pair with the accessory, and the host device may determine whether it is authorized to automatically connect with the accessory by searching for a matching key among the keys associated with the account.

The key may be, for example, public key 116, private key 114, a unique identification code, or any other form of identification that host device received from account 130 for the purpose of pairing with an accessory that is also associated with the account. In the example shown in FIG. 3, encrypted message 186 shall be considered to include public key 116.

The host device may receive the encrypted message transmitted by the accessory. Upon receipt of the encrypted message, the host device 140 may decrypt the message. The message may, for example, be decrypted using the public key. For instance, the host device may use the public key associated with the account, and corresponding to the private key of the accessory, to decrypt the message.

Upon receipt of the key from the accessory, the host device may determine whether the key matches the key of an accessory associated with the account. For example and as noted above, data 144 of host device 140 may store public key 116 among the plurality of public keys 135. Since message 186 from accessory 110 includes public key 116, and since the plurality of keys 135 stored by host device 140 includes a key with the same value as public key 116, host device 140 may validate the key, e.g., determine that it is authorized to automatically connect 188 with accessory 110.

In another example, the accessory may encrypt a message including a secret value using the private key. After the host device receives the encrypted message, the accessory may expect an echo of this value back from the host device. The echo back may include a similarly encrypted message using the public key. This may, for example, indicate that the host device has the public key that matches the public key of the accessory associated with the account.

Figure 4:
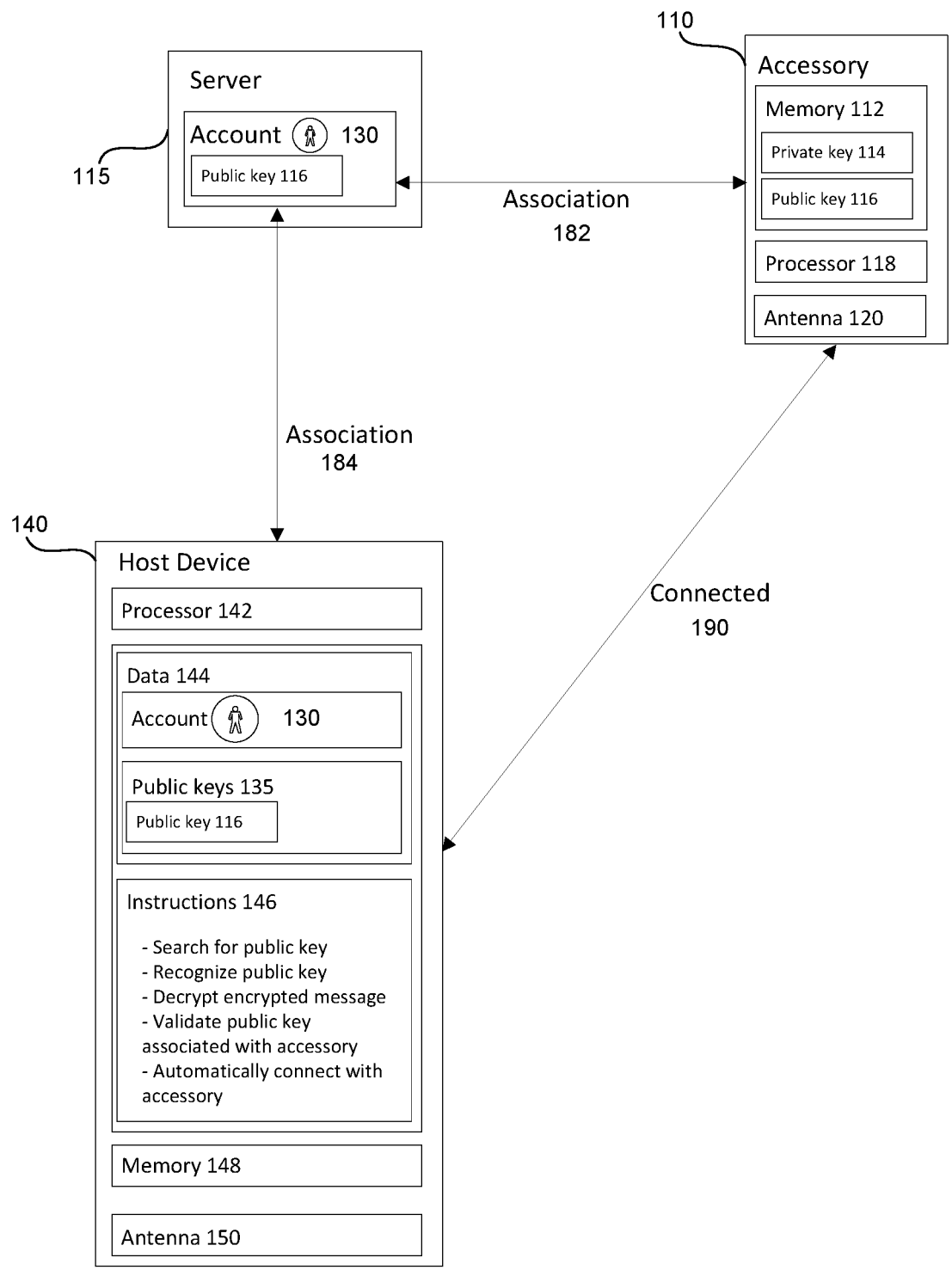
FIG. 4 is a functional diagram further exemplifying the connections among a host device, a server, and an accessory in accordance with aspects of the disclosure.

FIG. 4 illustrates relationships between a host device and accessory after the host device validate the key associated with both the accessory and the account. For example, after host device 140 validates the key sent by accessory 110, host device 140 may automatically connect 190 to the accessory. For instance, upon confirming that the public key 116 stored in message 186 from accessory 110 matches one of the keys 135 that are stored on host device 110 and associated with the account 130, host device 140 may automatically connect with accessory 110 (e.g., via Bluetooth pairing) without requiring any intervention or confirmation from the user. By way of further example, host device 140 and accessory 110 may automatically connect to each other and exchange data beyond what is specific to creating (or maintaining) the connection itself. In that regard, if the accessory is a pair of headphones and the host device is a phone, the headphones may receive audio signals sent from the phone. Alternatively, if the accessory is a game controller and the host device is a console, the console may accept game commands sent from the game controller.

The accessory may be powered on before the user receives it, in which case the accessory and host device may connect automatically without any user intervention beyond bringing the accessory and host device within range of each other. As a result, instead of an otherwise cumbersome or complicated OOBE experience, the user may begin using the accessory for its intended purpose (e.g., as headphones) immediately after taking the accessory out of the box. Alternatively, if accessory 110 does not come powered on, user 125 may only have to un-box and power on accessory 110 in order for it to automatically connect with host device 140.

To the extent the OOBE involves actions that are not specific to connecting the devices, those aspects may be completed OOBE upon receipt of the accessory or at the time of purchase. Such OOBE actions may include, for example, reading and signing off on legalese, inputting user 125 data, confirming instructions for use, opting in or out of particular features, data collection, and the like. The vendor may offer the user 125 the ability to customize features related to the accessory at the time of sale. For example, if the user purchases the accessory at a brick and mortar store, a vendor may provide a user with access to a kiosk for the purpose of securely logging into their account and opting in or out of particular features. The accessory's key and the user's selections may then be associated with account 130, host device 110 may retrieve the user's selections from server 115 along with the accessory's key, and then operate in accordance with the user's selection. Therefore, upon receipt of the purchased accessory 110, the user 125 may have already completed the OOBE and may begin using accessory 110 immediately.

Figure 5:
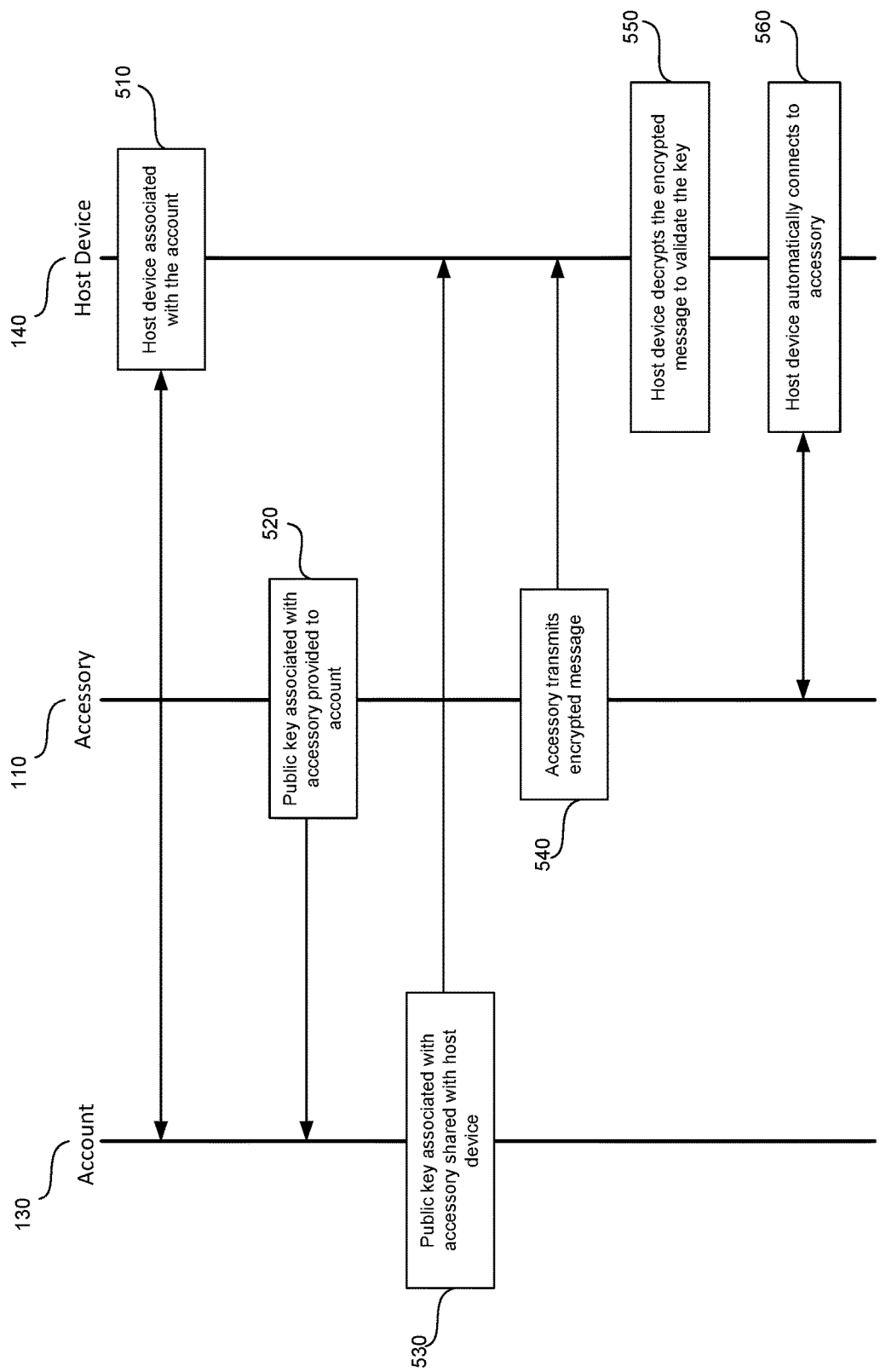
FIG. 5 is a diagram in accordance with aspects of the disclosure.

FIG. 5 illustrates a sequence of steps that may occur among account 130, accessory 110, and host device 140. For example, in block 510, the host device may be associated with the account 130 stored on the server. According to one embodiment, the host device 140 may be associated with account 130 when setting up host device 140. For example, when setting up host device 140, the user may be asked to enter an email address and account 130 may be or include an email account, store account or cell phone account associated with that address.

In block 520, the public key associated with the accessory may be associated with the account. According to one embodiment, when the user purchases the accessory, the relevant store may associate the public key with the account. For instance, if the user obtained the accessory from a different entity than the entity that hosts the account, the user may permit the first entity to send the public key and the user's account identifier to the second entity.

Once the account and the public key associated with the accessory are associated with each other, in block 530, the public key associated with accessory may be shared with the host device. According to one example, the public key associated with accessory 110 may be transmitted to the host device via a server. Alternatively, the host device 140 may send a request to the server to receive the public key associated with account 130.

In block 540, the accessory may transmit an encrypted message. The encrypted message may contain a key for automatically connecting the accessory and host device.

In block 550, the host device may receive, decrypt and extract the key from the encrypted message. For example, the key may be the public key. To validate the key, the host device may recognize the public key associated with the accessory as being a public key associated with the account associated with the host device.

In block 560, host device may automatically connect to the accessory.

Figure 6:
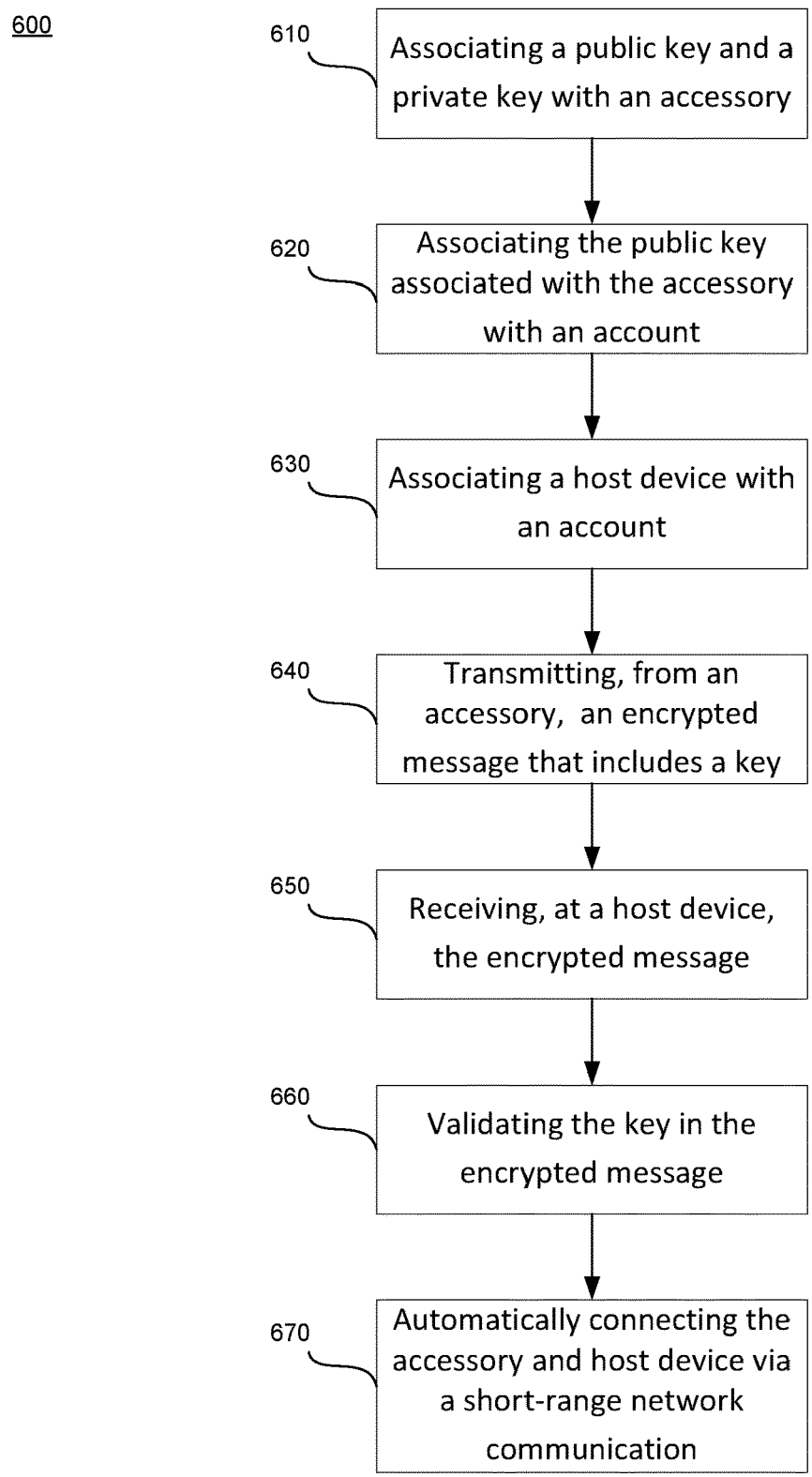
FIG. 6 is a flow diagram in accordance with aspects of the disclosure.

Flow diagram 600 of FIG. 6 is an example of actions that may be performed in accordance with aspects of the technology described herein. A public key and a private key may be associated with an accessory (block 610). This may occur at the time of manufacturing or after. The public key associated with the accessory may then be associated with an account (block 620). A host device may be associated with the account (block 630). The account associated with the accessory and the account associated with the host device may be the same account. The accessory may transmit an encrypted message that may include a key (block 640). The key may be the public key associated with the device. The host device may receive the encrypted message transmitted by the accessory (block 650). The host device may validate the key in the encrypted message (block 660).

The host device and accessory may automatically connect via short-range wireless pairing (block 670).

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An accessory, comprising:
   a short-range wireless network antenna;
   memory storing a public key and a private key, the public key associated with the accessory and an account, wherein the account is associated with a vendor or a provider; and
   one or more processors coupled to the memory, the one or more processors being configured to establish an initial connection between a host device and the accessory, wherein establishing the initial connection comprises:
      encrypting a message containing the public key using the private key;
      transmitting the encrypted message to the host device associated with the account; and
      automatically connecting to the host device via the short-range wireless network antenna after the public key is validated.

2. The accessory of claim 1, wherein automatically connecting comprises connecting without receiving a user input.

3. The accessory of claim 1, wherein the public key is associated with a serial number of the accessory.

4. The accessory of claim 1, wherein automatically connecting comprises receiving confirmation from the host device that the accessory is associated with the account.

5. A method, comprising:
   storing, by an accessory, a public key and a private key, wherein the public key is associated with the accessory, an account, and a host device, and wherein the account is associated with a vendor or a provider;
   encrypting, by the accessory, a message containing the public key using the private key;
   transmitting, by the accessory when establishing an initial connection between the host device and the accessory, the encrypted message, wherein the encrypted message is adapted to be decrypted by the host device;
   receiving, by the accessory, validation of the public key from the host device; and
   automatically establishing the initial connection between the accessory and the host device via short-range wireless pairing after receiving the validation of the public key.

6. The method of claim 5, wherein the public key and the private key are associated with the accessory during purchase by a user.

7. The method of claim 6, wherein the public key and the private key are associated with the accessory automatically when purchased via a website associated with the account.

8. The method of claim 5, wherein the public key and the private key are associated with the accessory after purchase by a user.

9. The method of claim 8, wherein the public key and the private key are associated with the accessory using radio-frequency identification.

10. The method of claim 8, wherein the public key and the private key are associated with the accessory using near-field communication.

11. The method of claim 5, wherein the public key is associated with a serial number of the accessory.

12. The method of claim 5, wherein the account is identified by a user's email address and associating the public key with the account comprises receiving the public key and the user's email address.

13. The method of claim 5, wherein automatically connecting comprises receiving confirmation from the host device that the accessory is associated with the account.

14. A method, comprising:
   associating a host device with an account,
      wherein the account is associated with a vendor or a provider, and
      wherein the account is also associated with an accessory having a public key and a private key;
   associating, via a network, the public key of the accessory with the host device;
   receiving, by the host device when establishing an initial connection between the host device and the accessory, an encrypted message transmitted by the accessory, wherein the encrypted message is encrypted using the private key;
   decrypting, by one or more processors of the host device, the encrypted message to obtain the public key;
   validating, by the one or more processors of the host device, the public key; and
   establishing, after validating the public key, the initial connection between the host device and the accessory via short-range wireless pairing.

15. The method of claim 14, further comprising searching, using the one or more processors of the host device, for the public key.

16. The method of claim 14, wherein the accessory comprises headphones, and further comprising providing audio signals to the accessory after connecting to the accessory.

17. The accessory of claim 1, wherein the accessory is further configured to receive a user input to associate the accessory with the account before automatically connecting to the host device.

18. The method of claim 5 further comprising:
   receiving, by the accessory, a user input to associate the accessory with the account before automatically connecting to the host device.

* * * * *